(12) United States Patent
Porras et al.

(10) Patent No.: US 8,214,901 B2
(45) Date of Patent: Jul. 3, 2012

(54) METHOD AND APPARATUS FOR COMBATING MALICIOUS CODE

(75) Inventors: Phillip Porras, Cupertino, CA (US); Linda Briesemeister, San Francisco, CA (US)

(73) Assignee: SRI International, Menlo Park, CA (US)

(*) Notice: Subject to any disclaimer, the term of this patent is extended or adjusted under 35 U.S.C. 154(b) by 1087 days.

(21) Appl. No.: 11/230,419

(22) Filed: Sep. 19, 2005

(65) Prior Publication Data

US 2007/0006313 A1    Jan. 4, 2007

Related U.S. Application Data

(60) Provisional application No. 60/610,687, filed on Sep. 17, 2004, provisional application No. 60/673,986, filed on Apr. 21, 2005.

(51) Int. Cl.
*G06F 11/00* (2006.01)

(52) U.S. Cl. .......... 726/24; 726/22; 726/23; 726/25; 713/189; 713/190; 713/191; 713/192; 713/193; 713/194; 717/174; 717/175; 717/176; 717/177; 717/178; 705/51; 705/52; 705/53; 705/54

(58) Field of Classification Search .......... 726/22–25; 713/189–194; 717/174–178; 705/51–54
See application file for complete search history.

(56) References Cited

U.S. PATENT DOCUMENTS

| | | | |
|---|---|---|---|
| 6,971,028 B1 * | 11/2005 | Lyle et al. | 726/25 |
| 2002/0013910 A1 * | 1/2002 | Edery et al. | 713/201 |
| 2002/0199116 A1 * | 12/2002 | Hoene et al. | 713/201 |
| 2003/0023875 A1 * | 1/2003 | Hursey et al. | 713/201 |
| 2004/0153665 A1 * | 8/2004 | Browne | 713/201 |
| 2005/0050359 A1 * | 3/2005 | Liang | 713/201 |
| 2005/0097179 A1 * | 5/2005 | Orme | 709/207 |
| 2005/0160292 A1 * | 7/2005 | Batthish et al. | 713/201 |
| 2005/0198519 A1 * | 9/2005 | Tamura et al. | 713/188 |

* cited by examiner

*Primary Examiner* — Yin-Chen Shaw
*Assistant Examiner* — Roderick Tolentino

(57) ABSTRACT

A method and apparatus are provided for combating malicious code. In one embodiment, a method for combating malicious code in a network includes implementing a resource-limiting technique to slow a propagation of the malicious code and implementing a leap-ahead technique in parallel with the resource-limiting technique to defend against the malicious code reaching a full saturation potential in the network.

34 Claims, 4 Drawing Sheets

METHOD AND APPARATUS FOR COMBATING MALICIOUS CODE

CROSS REFERENCE TO RELATED APPLICATIONS

This application claims the benefit of U.S. Provisional Patent Application Ser. No. 60/610,687, filed Sep. 17, 2004 and of U.S. Provisional Patent Application Ser. No. 60/673,986, filed Apr. 21, 2005, both of which are herein incorporated by reference in their entireties.

REFERENCE TO GOVERNMENT FUNDING

This invention was made with Government support under grant number ANI-0335299, awarded by the National Science Foundation. The Government has certain rights in this invention.

FIELD OF THE INVENTION

The present invention relates generally to computer networks and relates more specifically to defending networks against malicious code.

BACKGROUND OF THE DISCLOSURE

In recent years, outbreaks of self-propagating malicious code ("worms") have frequently plagued public networks, even penetrating into well-protected enterprises. Worms have evolved from relatively rare nuisance applications into one of the most well-recognized information-based global security threats. To combat this problem, there has been a surge of research into developing techniques for recognizing worms and defending networks against emerging epidemics. To date, however, no single approach has proven completely effective in containing the propagation of worms, as many different kinds of worms (e.g., variable speed random-scan worms, topology-based worms, etc.) employing many different kinds of infection strategies exist.

Thus, there is a need in the art for a method and apparatus for combating malicious code.

SUMMARY OF THE INVENTION

A method and apparatus are provided for combating malicious code. In one embodiment, a method for combating malicious code in a network includes implementing a resource-limiting technique to slow a propagation of the malicious code and implementing a leap-ahead technique in parallel with the resource-limiting technique to defend against the malicious code reaching a full saturation potential in the network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to a method and apparatus for combating malicious code (worms). The present invention provides improved containment and control of worm infections in a network by integrating complementary defense strategies both to slow the spread of worms and to prevent worms from reaching their full saturation potential within the network.

Figure 1:
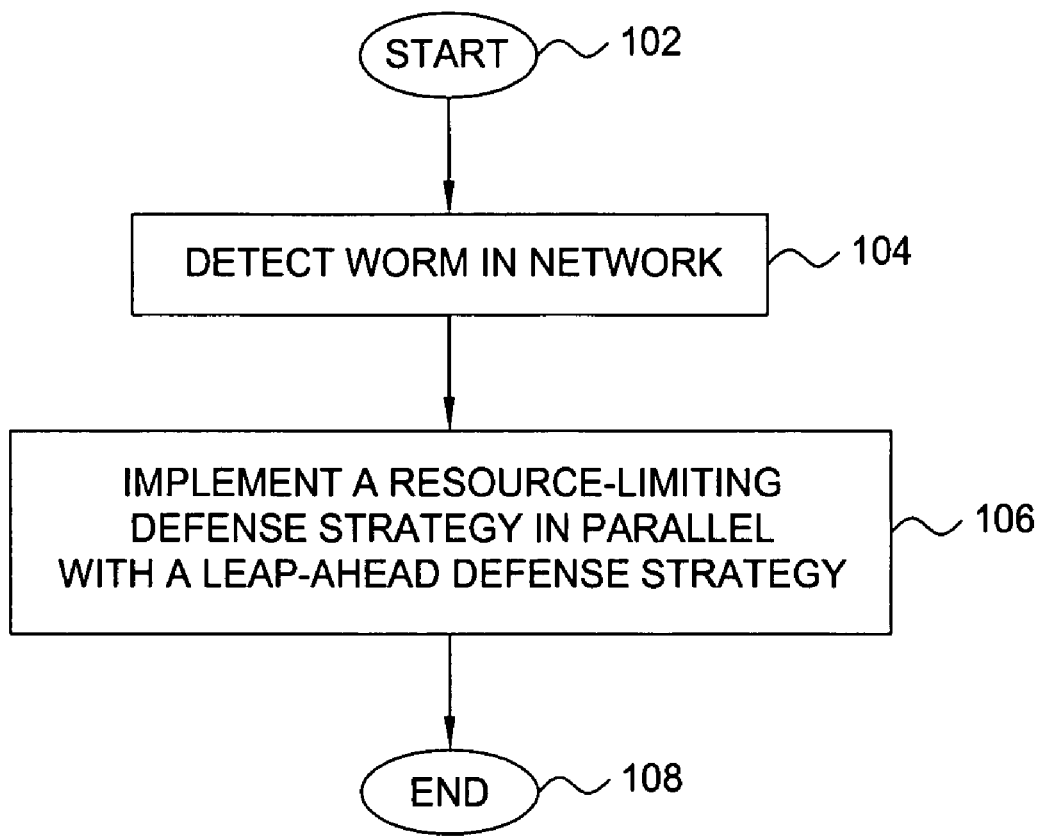
FIG. 1 is a flow diagram illustrating one embodiment of a method for combating malicious code (e.g., worms), according to the present invention.

FIG. 1 is a flow diagram illustrating one embodiment of a method 100 for combating malicious code (e.g., worms), according to the present invention. The method 100 is initialized at step 102 and proceeds to step 104, where the method 100 detects a worm in a computer network.

In step 106, the method 100 reacts to the detection of the worm by implementing a resource-limiting defense strategy in parallel with a leap-ahead defense strategy.

A resource-limiting defense strategy is one that delays worm propagation by throttling or limiting access to resources that aggressive worms are know to consume at high rates (e.g., a volume of outbound connections, a rate of outbound connections). In one embodiment, the resource-limiting defense strategy implemented in step 106 is a connection rate limiting strategy that limits the number of outbound nodes that an internal machine may contact per unit of time.

A leap-ahead defense strategy is one that relies on cooperative information sharing (e.g., hierarchical or peer-based) to prevent saturation of the network by a worm. Specifically, a leap-ahead strategy uses information sharing to facilitate the recognition of emerging worms and the coordination of defensive action, for instance by spreading warnings to network segments not yet affected by the worm. In one embodiment, the leap-ahead defense strategy implemented in step 106 is a peer-based strategy in which nodes pre-select a set of peers with which to share worm indicators and in turn are selected by other domains to receive indicators. In another embodiment, randomly selected groups of peers are periodically recomputed to in order to prevent a worm from learning a static group structure and attempting to pre-calculate an infection sequence map that avoids threshold crossing. In such an embodiment, re-computation of the peer group could be performed by each peer or by a hierarchical coordinator function.

The method 100 is terminated in step 108.

In this way, the method 100 provides improved containment and control of worm infections in a network. In particular, by integrating the resource-limiting defense strategy, which can operate autonomously at network domains, in parallel with the leap-ahead defense strategy, which provides group-wide protection, better containment is achieved than virtually any single known containment strategy. For example, resource-limiting defense strategies tend to effectively slow worm growth rate to a degree that makes containment manageable, while leap-ahead defense strategies tend to prevent worms from reaching full saturation potential. Thus, implementation of the resource-limiting defense strategy should impose a delay on fast-spreading worms that is substantial enough to allow peer groups operating under the leap-ahead defense strategy to coordinate and block the worm before it can achieve full saturation potential.

Figure 2:
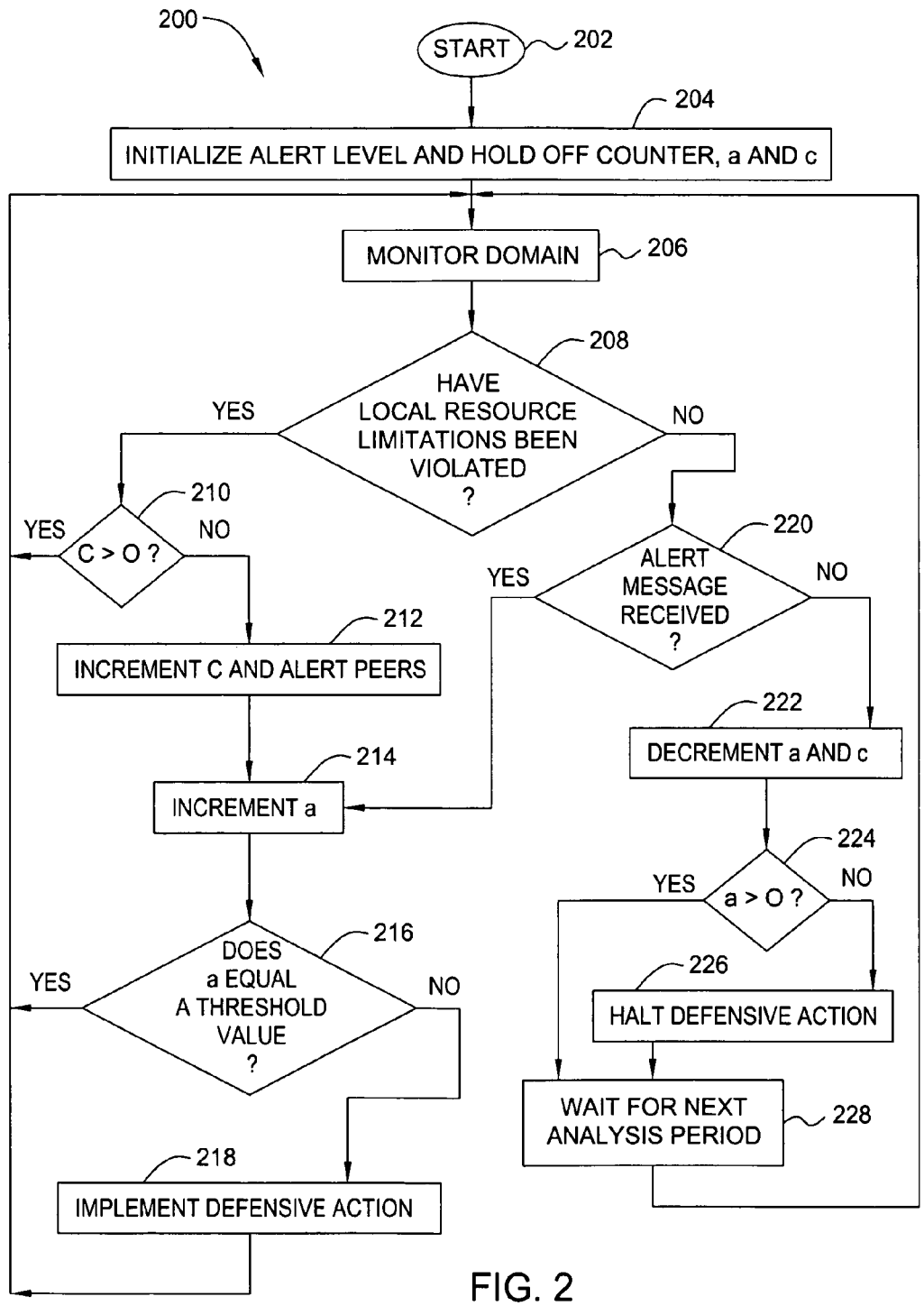
FIG. 2 is a flow diagram illustrating one embodiment of a second method for combating malicious code (e.g., worms), according to the present invention.

FIG. 2 is a flow diagram illustrating one embodiment of a second method 200 for combating malicious code (e.g., worms), according to the present invention. In particular, the method 200 is a more detailed embodiment of the method 100, and may be implemented, for example, at a network domain gateway that interfaces one or more end nodes to a network. FIG. 2 illustrates operation of the method 200 within a single analysis period, where the method 200 may be performed iteratively over several consecutive analysis periods (e.g., once every second for x seconds, or continuously).

The method 200 is initialized at step 202 and proceeds to step 204, where the method 200 initializes an alert level counter and a hold off counter. The alert level counter tracks the instances of worm alerts being generated or received by the method 200. The hold off counter is implemented to control a stream of resource limitation violations, as discussed in greater detail below. In one embodiment, both the alert level counter and the hold off counter are initialized to their lowest possible values in step 204. In one embodiment, this lowest possible value is zero.

In step 206, the method 200 monitors the network, e.g., to detect the presence of a worm. In step 208, the method 200 determines whether local resource limitations have been violated, e.g., in accordance with a resource-limiting defense strategy. In one embodiment, local resource limitations have been violated if any of the end nodes (e.g., user computing devices) within a domain managed by the gateway at which the method 200 is executing have made more than a threshold number of outbound connections per unit time. This limitation is motivated by the observation that the volume of outbound connections relative to a unique node is relatively small under most operating conditions, but tends to increase when the node is infected by a worm.

If the method 200 determines in step 208 that local resource limitations have been violated, the method 200 proceeds to step 210 and determines whether the value of the hold off counter, c, is greater than zero (or the minimum value initialized in step 204). If the method 200 determines in step 210 that the value of the hold off counter, c, is greater than zero, the method 200 returns to step 206 and proceeds as described above to monitor the domain for worms. In essence, this indicates that the method 200 is operating inside a hold off period during which additional alert messages relating to resource limitation violations are suppressed in order to prevent a single end host from causing an entire portion of the network to implement defensive action (e.g., by generating a stream of resource limitation violations over multiple periods of time, such as over several seconds), as discussed in greater detail below.

Alternatively, if the method 200 determines in step 208 that the value of the hold off counter, c, is not greater than zero (e.g., is zero), the method 200 proceeds to step 212 and sends an alert message to a pre-selected group of peers (e.g., end nodes, other domain gateways, etc.). In one embodiment, the alert message is sent in accordance with a known leap-ahead defense strategy. In one embodiment, the group of peers comprises G−1 nodes, where G is the group size. In further embodiments, the IP addresses of all nodes or domain gateways executing the method 200 are arranged in a ring of ascending order, and each node or domain gateway selects the next G−1 addresses to be its group of peers. In this way, it is substantially ensured that each node or domain gateway executing the method 200 becomes a peer of the same number of nodes or domain gateways.

In addition, the method 200 increments c by a value, s, indicative of the severity of the alert. This value, s, corresponds to a period of time (e.g., a number of seconds) during which additional alert messages relating to resource limitation violations are suppressed in accordance with a hold off period.

In step 214, the method 200 increments the alert level counter, a. In one embodiment, the alert level counter, a, is incremented by the smaller of a+s and $\alpha$, where $\alpha$ is a pre-defined threshold alert value. Specifically, $\alpha$ defines the level of corroboration from other peers (e.g., the number of alert messages received from other nodes or domain gateways) that is required to support the adoption of a defensive action to combat the spread of a worm. For example, a low threshold alert value, $\alpha$, will permit quicker reaction to emerging infections, while a larger threshold alert value, $\alpha$, will reduce a number of false alarms. In one embodiment, the threshold alert value, $\alpha$ is calculated as:

$$\alpha = G/4 * s \qquad (\text{EQN. 1})$$

such that the threshold alert value, $\alpha$, is relative to the peer group size, G. The denominator, 4 in EQN. 1, may be adjusted as described above to tune the sensitivity of the method 200 to achieve desired results.

In step 218, the method 200 determines whether the new value of the alert level counter, a, is equal to the threshold alert value $\alpha$. If the method 200 determines in step 216 that the alert level counter, a, is not equal to the threshold alert value $\alpha$, the method 200 returns to step 206 and proceeds as described above to monitor the domain for worms.

Alternatively, if the method 200 determines in step 216 that the alert level counter, a, is equal to the threshold alert value $\alpha$, the method 200 proceeds to step 218 and implements defensive action to prevent and/or slow an infection attempt (the spread of the worm). In one embodiment, this defensive action includes dropping outbound end node connections that exceed a threshold number. In another embodiment, defensive action includes enabling a filter (e.g., an inbound traffic filter) to selectively block traffic that matches the characteristics of the packets associated with the dropped outbound connections. In one embodiment, this filter is derived dynamically.

Referring back to step 208, if the method 200 determines in step 208 that local resource limitations have not been violated, the method 200 proceeds to step 220 and determines whether any alert messages have been received. In one embodiment, alert messages are received from another node or network domain gateway that has chosen to inform the domain gateway at which the method 200 is executing of any alerts it has received or generated (e.g., by designating the gateway at which the method 200 is executing as its peer).

If the method 200 determines in step 220 that at least one alert message has been received, the method 200 proceeds to step 214 and proceeds as described above in order to determine whether this newly received alert message constitutes sufficient corroboration to implement a defensive action.

Alternatively, if the method 200 determines in step 220 that no alert messages have been received, the method 200 proceeds to step 222 and decrements the alert level counter, a, and the hold off counter, c. In one embodiment, the alert level counter, a, is decremented to the larger of zero (or the minimum value initialized in step 204) and a−1. In one embodiment, the hold off counter, c, is decremented to the larger of zero (or the minimum value initialized in step 204) and c−1.

In step 224, the method 200 determines whether the alert level counter, a, is now greater than zero (or the minimum value initialized in step 204). If the method 200 determines that the alert level counter, a, is not greater than zero (or the minimum value initialized in step 204), the method 200 proceeds to step 226 and halts any defensive action being taken to combat the spread of worms. Thus, temporal decay of the alert level counter, a, transitions the method 200 from a defensive posture to a normal state when alerts of worm activity are not received or generated for a period of time. In another embodiment, nondeterminism may be introduced in order to combat worms using strategic dormancy to avoid their triggering defensive actions.

The method 200 then proceeds to step 228 and waits for the next analysis period to begin. In one embodiment, a new analysis period begins every second, such that the method 200 is executed every second. Once the next analysis period begins, the method 200 returns to step 206 and proceeds as described above in order to monitor the domain for worms.

Thus, in essence, the method 200 uses threshold violations as recorded by a resource-limiting defense strategy as inputs to a leap-ahead strategy that relies on peer alerts. This approach thus takes advantage of complementary defensive strategies to maximize the types of worms that can be detected and contained (e.g., resource-limiting defense strategies tend to defend well against fast scan worms but are less effective against slower scan worms, while leap-ahead defense strategies tend to defend well against slow scan worms, but are less effective against faster scan worms). Moreover, the method 200 substantially ensures that neither a single resource violation or alert, nor a collection of solely local alerts, will trigger defensive action across a group of peer networks. Thus, improved worm containment is achieved with a relatively low rate of false alarms. For some classes of worms, such as some random scanning worms, such an approach offers a substantially signature-free solution for slowing worm propagation and preventing full saturation potential from being achieved.

Figure 3:
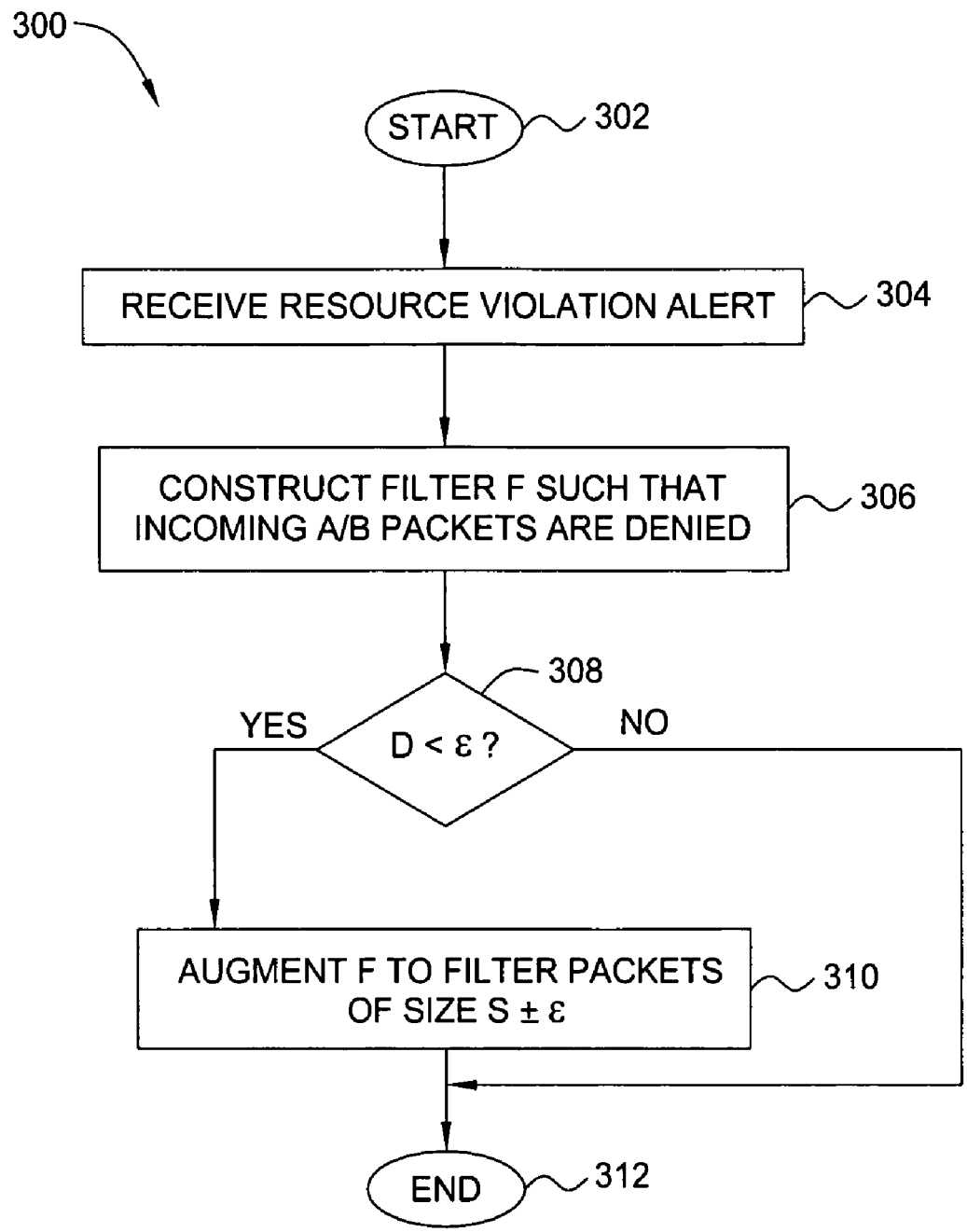
FIG. 3 is a flow diagram illustrating one embodiment of a method for dynamically constructing a filter to contain emerging worms, according to the present invention.

FIG. 3 is a flow diagram illustrating one embodiment of a method 300 for dynamically constructing a filter to contain emerging worms, according to the present invention. The method 300 may be implemented, for example, in accordance with step 218 of the method 200.

The method 300 is initialized at step 302 and proceeds to step 304, where the method 300 receives a resource violation alert from a peer. In one embodiment, the resource violation alert includes: (1) the peer from which the alert was received; (2) a port/protocol pair, A/B, representing the dominant target port/protocol used by the peer's outbound packets during the time, t, at which the resource violation alert was triggered; (3) a datagram size, S, representing the average datagram sent by the peer during the time, t; and (4) a standard deviation, D, of datagrams sent by the peer during the time, t.

In step 306, the method 300 constructs a filter, F, such that incoming A/B packets are denied.

In step 308, the method 300 determines whether the standard deviation, D, is less than $\epsilon$, where $\epsilon$ is an empirically derived value or threshold that is globally determined. In particular, a value is derived for $\epsilon$ such that the filter, F, can match packets of similar attributes (e.g., size), where those attributes may vary within some range of tolerance. If the method 300 determines in step 308 that the standard deviation, D, is less than $\epsilon$, the method 300 proceeds to step 310 and augments the filter, F, to filter packets of size S±$\epsilon$. The method 300 then terminates in step 312 with the filter, F, being thus established.

Alternatively, if the method 300 determines in step 308 that the standard deviation, D, is not less than $\epsilon$, the method 300 terminates in step 312.

The establishment of a filter in accordance with the method 300 is therefore based on the observation of some degree of correlation among packets at nodes or domain gateways generating resource violation alerts.

Figure 4:
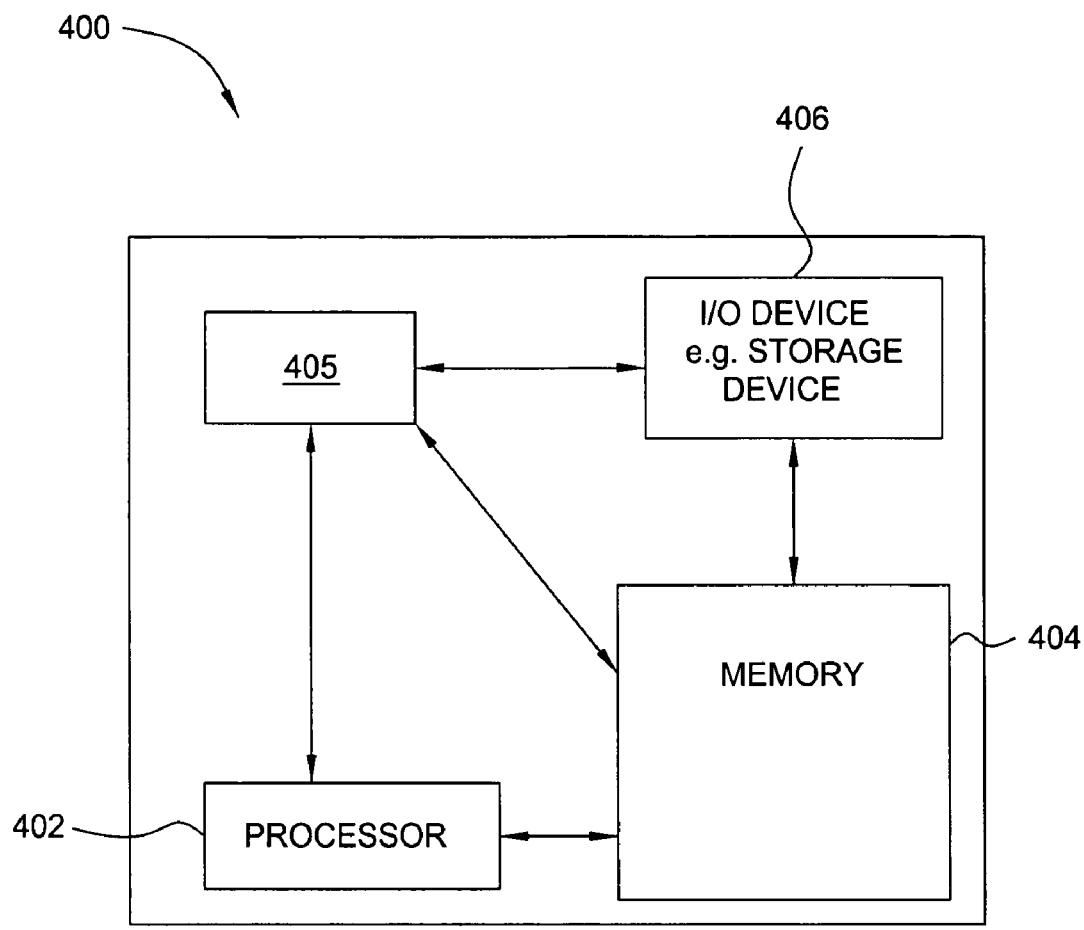
FIG. 4 is a high level block diagram of the present method for worm containment that is implemented using a general purpose computing device.

FIG. 4 is a high level block diagram of the present method for worm containment that is implemented using a general purpose computing device 400. In one embodiment, a general purpose computing device 400 comprises a processor 402, a memory 404, a worm containment module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the worm containment module 405 can be implemented as a physical device or subsystem that is coupled to a processor through a communication channel.

Alternatively, the worm containment module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the worm containment module 405 for combating malicious code in networks described herein with reference to the preceding Figures can be stored on a computer readable medium or carrier (e.g., RAM, magnetic or optical drive or diskette, and the like).

Thus, the present invention represents a significant advancement in the field of computer networks. The present invention provides improved containment and control of worm infections in a network by integrating complementary defense strategies both to slow the spread of worms and to prevent worms from reaching their full saturation potential within the network.

Although various embodiments which incorporate the teachings of the present invention have been shown and described in detail herein, those skilled in the art can readily devise many other varied embodiments that still incorporate these teachings.

What is claimed is:

1. A method for combating malicious code in a network, the method comprising:

implementing a resource-limiting technique to slow a propagation of said malicious code through said network; and implementing a leap-ahead technique in parallel with said resource-limiting technique to defend against said malicious code reaching a full saturation potential in said network, wherein said implementing said leap-ahead technique comprises sending an alert message to a group of one or more peers to inform said group of a resource limitation violation within the network, and wherein a membership in said group is reselected at a later time period such that one or more reselected peers in said group at said later time period is different from said one or more peers in said group, wherein at least one of said implementing said resource-limiting technique and said implementing said leap-ahead technique is performed using a processor.

2. The method of claim 1, wherein said resource-limiting technique limits a number of outbound connections that a node in said network is allowed to make per unit of time.

3. The method of claim 1, wherein said leap-ahead technique comprises:

generating said alert message in response to detecting said resource limitation violation; and distributing said alert message to said group.

4. The method of claim 3, wherein said generating is performed in response to said resource-limiting technique detecting a breach of a threshold relating to resource usage.

5. The method of claim 3, wherein said leap-ahead technique further comprises:
receiving one or more alert messages from one or more peers in said network, said one or more alert messages indicating a detection of said malicious code.

6. The method of claim 1, further comprising:
implementing a defensive action if a combination of said resource-limiting technique and said leap-ahead technique indicates a threshold amount of malicious code activity.

7. The method of claim 6, wherein said defensive action is halted if said malicious code activity is observed to fall below said threshold amount.

8. The method of claim 6, wherein said threshold amount is adjustable.

9. The method of claim 6, wherein said defensive action is an enablement of a filter to selectively block network traffic meeting defined characteristics.

10. The method of claim 9, wherein said defined characteristics correspond to characteristics of packets dropped in accordance with said resource-limiting technique.

11. The method of claim 10, wherein said defined characteristics include at least one of: a port/protocol pair representing a dominant target port/protocol used by outbound packets during a time at which a violation of a resource usage threshold is detected, an average datagram size sent during said time at which said violation of said resource usage threshold is detected, or a standard deviation of datagrams sent during said time at which said violation of said resource usage threshold is detected.

12. The method of claim 11, comprising:
denying at least one incoming packet corresponding to said dominant target port/protocol.

13. A computer readable storage device containing an executable program for combating malicious code in a network, the method comprising:
implementing a resource-limiting technique to slow a propagation of said malicious code through said network; and
implementing a leap-ahead technique in parallel with said resource-limiting technique to defend against said malicious code reaching a full saturation potential in said network, wherein said implementing said leap-ahead technique comprises sending an alert message to a group of one or more peers to inform said group of a resource limitation violation within the network, and wherein a membership in said group is reselected at a later time period such that one or more reselected peers in said group at said later time period is different from said one or more peers in said group.

14. The computer readable storage device of claim 13, wherein said resource-limiting technique limits a number of outbound connections that a node in said network is allowed to make per unit of time.

15. The computer readable storage device of claim 13, wherein said leap-ahead technique comprises:
generating said alert message in response to detecting said resource limitation violation; and
distributing said alert message to said group.

16. The computer readable storage device of claim 15, wherein said generating is performed in response to said resource-limiting technique detecting a breach of a threshold relating to resource usage.

17. The computer readable storage device of claim 15, wherein said leap-ahead technique further comprises:
receiving one or more alert messages from one or more peers in said network, said one or more alert messages indicating a detection of said malicious code.

18. The computer readable storage device of claim 13, further comprising:
implementing a defensive action if a combination of said resource-limiting technique and said leap-ahead technique indicates a threshold amount of malicious code activity.

19. The computer readable storage device of claim 18, wherein said defensive action is halted if said malicious code activity is observed to fall below said threshold amount.

20. The computer readable storage device of claim 18, wherein said threshold amount is adjustable.

21. The computer readable storage device of claim 18, wherein said defensive action is an enablement of a filter to selectively block network traffic meeting defined characteristics.

22. The computer readable storage device of claim 21, wherein said defined characteristics correspond to characteristics of packets dropped in accordance with said resource-limiting technique.

23. The computer readable storage device of claim 22, wherein said defined characteristics include at least one of: a port/protocol pair representing a dominant target port/protocol used by outbound packets during a time at which a violation of a resource usage threshold is detected, an average datagram size sent during said time at which said violation of said resource usage threshold is detected, or a standard deviation of datagrams sent during said time at which said violation of said resource usage threshold is detected.

24. The computer readable storage device of claim 23, comprising:
denying at least one incoming packet corresponding to said dominant target port/protocol.

25. Apparatus for combating malicious code in a network, the apparatus comprising:
a processor adapted to implement a resource-limiting technique to slow a propagation of said malicious code through said network and for implementing a leap-ahead technique in parallel with said resource-limiting technique to defend against said malicious code reaching a full saturation potential in said network; and
an output device adapted to send an alert message to a group of one or more peers to inform said group of a resource limitation violation within the network, and wherein a membership in said group is reselected at a later time period such that one or more reselected peers in said group at said later time period is different from said one or more peers in said group.

26. The method of claim 1, further comprising:
periodically re-computing said group.

27. The method of claim 3, wherein said distributing comprises:
determining a value of a hold off counter;
suppressing the alert message when the value of the hold off counter is greater than zero;
sending the alert message to the group when the value of the hold off counter is not greater than zero; and
incrementing the value of the hold off counter after sending the alert message.

28. The method of claim 27, wherein an amount by which the value of the hold off counter is incremented is dependent on a severity of the resource limitation violation.

29. The method of claim 28, wherein the amount corresponds to a period of time during which additional alert messages are to be suppressed.

30. The method of claim 27, further comprising:
incrementing an alert level counter after sending the alert message, where the alert level counter defines a cumulative number of alert messages generated and received from one or more peers.

31. The method of claim 30, wherein an amount by which the value of the alert level counter is incremented is a smaller value of: a current value of the alert level counter plus a value dependent on a severity of the resource limitation violation and a predefined alert threshold value.

32. The method of claim 31, wherein the predefined alert threshold value defines a number of alert messages that must be received from the one or more peers in order to support adoption of a defensive action to combat the malicious code.

33. The method of claim 1, wherein said detecting comprises:
receiving at least one alert message from at least one peer, wherein the at least one alert message contains information regarding the resource limitation violation.

34. The method of claim 1, wherein the group comprises a subset randomly selected from among a plurality of peers.

* * * * *